(12) United States Patent
Peng et al.

(10) Patent No.: US 11,387,951 B2
(45) Date of Patent: Jul. 12, 2022

(54) COMMUNICATION METHOD AND DEVICE FOR HYBRID AUTOMATIC REPEAT REQUEST

(71) Applicant: Huawei Technologies Co., Ltd., Shenzhen (CN)

(72) Inventors: Jinlin Peng, Shanghai (CN); Xinghua Song, Beijing (CN); Fan Wang, Berkshire (GB); Hao Tang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 16/938,701

(22) Filed: Jul. 24, 2020

(65) Prior Publication Data

US 2020/0358562 A1    Nov. 12, 2020

Related U.S. Application Data

(63) Continuation of application No. PCT/CN2019/073182, filed on Jan. 25, 2019.

(30) Foreign Application Priority Data

Jan. 26, 2018  (CN) .......................... 201810078914.8

(51) Int. Cl.
*H04W 76/27*   (2018.01)
*H04L 1/18*    (2006.01)
(Continued)

(52) U.S. Cl.
CPC ......... *H04L 1/1819* (2013.01); *H04B 7/0478* (2013.01); *H04W 24/08* (2013.01);
(Continued)

(58) Field of Classification Search
CPC ........... H04W 72/0446; H04W 72/042; H04W 76/27; H04W 24/08; H04B 7/0478;
(Continued)

(56) References Cited

U.S. PATENT DOCUMENTS

| 2010/0080176 A1* | 4/2010 | Maas | H04L 1/0026 370/329 |
| 2011/0235599 A1* | 9/2011 | Nam | H04L 5/0055 370/329 |

(Continued)

FOREIGN PATENT DOCUMENTS

| RU | 2631671 C2 | 9/2017 |
| WO | 2017003264 A1 | 1/2017 |

OTHER PUBLICATIONS

Samsung, "Processing time and number of HARQ processes", 3GPP TSG RAN WG1 Meeting #88, R1-1702991, Samsung, Athens, Greece, Feb. 13-17, 2017, total 4 pages.
(Continued)

*Primary Examiner* — Wei Zhao
(74) *Attorney, Agent, or Firm* — Slater Matsil, LLP

(57) ABSTRACT

Embodiments of this application provide a communication method and a device, and relate to the field of communication technologies. An example solution is as follows: determining, by a communications device, a quantity of physical downlink shared channels PDSCHs based on a value set of K1 and a time domain resource allocation table; determining, by the communications device, a quantity of physical downlink control channels (PDCCHs) based on the value set of K1, a value of K0 in the time domain resource allocation table, a PDCCH period, a PDCCH monitor offset, and a PDCCH monitor pattern; and determining, by the communications device, a HARQ codebook based on the quantity of PDSCHs and the quantity of PDCCHs.

16 Claims, 3 Drawing Sheets

Determine a quantity of PDSCHs based on a value set of K1 and a time domain resource allocation table — 101

Determine a HARQ codebook based on the quantity of PDSCHs (or referred to as a DL association set) — 102

(51) Int. Cl.
*H04B 7/0456* (2017.01)
*H04W 24/08* (2009.01)
*H04W 72/04* (2009.01)

(52) U.S. Cl.
CPC ..... *H04W 72/042* (2013.01); *H04W 72/0446* (2013.01); *H04W 76/27* (2018.02)

(58) Field of Classification Search
CPC ... H04L 5/0094; H04L 5/0055; H04L 5/0044; H04L 1/1854; H04L 1/1819
See application file for complete search history.

(56) References Cited

U.S. PATENT DOCUMENTS

2013/0322398 A1* 12/2013 Jang ................. H04L 1/0072
370/329
2018/0019844 A1 1/2018 Nogami et al.

OTHER PUBLICATIONS

Vivo, "Remaining issues on HARQ management", 3GPP TSG RAN WG1 Meeting AH 1801, R1-1800211, Vancouver, Canada, Jan. 22-26, 2018, total 4 pages.
3GPP TS 38.213 V15.0.0 (Dec. 2017), 3rd Generation Partnership Project, Technical Specification Group Radio Access Network, NR, Physical layer procedures for control (Release 15), total 56 pages.
Samsung, "Corrections on HARQ Feedback", 3GPP TSG RAN WG1 #AH 1801, R1-1800453, Vancouver, Canada, Jan. 22-26, 2018, total 9 pages.
Huawei et al.,"Summary of remaining issues on HARQ management", 3GPP TSG RAN WG1 Meeting Ad Hoc, R1-1800036, Vancouver, Canada, Jan. 22-26, 2018, total 13 pages.
Samsung, "HARQ-ACK codebook determination", 3GPP TSG RAN WG1 NR Ad-Hoc#2, R1-1710729, Qingdao, P.R. China, Jun. 27-30, 2017, total 4 pages.
Vivo, "Remaining issues on HARQ management", 3GPP TSG RAN WG1 Meeting #92bis, R1-1803837, Sanya, China, Apr. 16-20, 2018, total 3 pages.
Huawei et al.,"Other issues on NR CA and DC including SRS switching and SUL", 3GPP TSG RAN WG1 Meeting #90bis, R1-1717080, Prague, Czech Republic, Oct. 9-13, 2017, total 9 pages.
Samsung, "Corrections on HARQ Management", 3GPP TSG RAN WG1 #AH 1801, R1-1800452, Jan. 22-26, 2018, 7 pages, Vancouver, Canada.
3GPP TS 38.213 V1.3.0 (Dec. 2017); 3rd Generation Partnership Project; Technical Specification Group Radio Access Network; NR;Physical layer procedures for control (Release 15); R1-1721343, 58 pages.
CMCC, "Discussion on remaining issues for HARQ timing", 3GPP TSG RAN WGI Meeting AH 1801 R1-1800548, Jan. 22-26, 2018, 4 Pages, Vancouver, Canada.

* cited by examiner

COMMUNICATION METHOD AND DEVICE FOR HYBRID AUTOMATIC REPEAT REQUEST

CROSS-REFERENCE TO RELATED APPLICATIONS

This application is a continuation of International Application No. PCT/CN2019/073182, filed on Jan. 25, 2019, which claims priority to Chinese Patent Application No. 201810078914.8, filed on Jan. 26, 2018. The disclosures of the aforementioned applications are hereby incorporated by reference in their entireties.

TECHNICAL FIELD

Embodiments of this application relate to the field of communications technologies, and in particular, to a communication method and a device.

BACKGROUND

In a communications system, hybrid automatic repeat request (HARQ) is used, to ensure reliability and transmission efficiency of data transmission.

A basic principle of the HARQ may be understood as follows: A receive end feeds back a decoding result of data received from a transmit end to the transmit end, correct decoding is fed back as an acknowledgement (Acknowledge, ACK), and incorrect decoding is fed back as a negative acknowledgement (NACK). If the transmit end receives an ACK, new data may be transmitted to the receive end; or if the transmit end receives a NACK, the data may be retransmitted to the receive end.

How to effectively feed back the HARQ is an urgent problem that needs to be resolved in the industry.

SUMMARY

Embodiments of this application provide a communication method and a device, to ensure an effective HARQ feedback.

To achieve the foregoing objective, the following technical solutions are used in the embodiments of this application.

According to a first aspect, an embodiment of this application provides a communication method. The method includes: determining, by a communications device, a quantity of PDSCHs (or referred to as a DL association set) based on a value set of K1 and a time domain resource allocation table; and determining, by the communications device, a HARQ codebook based on the quantity of PDSCHs.

According to a second aspect, an embodiment of this application provides a communication method. The method includes: determining, by a communications device, a quantity of PDSCHs (or referred to as a DL association set) based on a value set of K1 and a time domain resource allocation table; determining, by the communications device, a quantity of PDCCHs; and determining a HARQ codebook based on the quantity of PDSCHs and the quantity of PDCCHs.

With reference to the first aspect or the second aspect, it can be endured that the communications device can effectively transmit the HARQ codebook.

With reference to the first aspect or the second aspect, the quantity of PDSCHs may be understood as a quantity of PDSCH occasions, and the quantity of PDCCHs may be understood as a quantity of PDCCH monitor occasions.

In a possible implementation in the first aspect or the second aspect, the value set of K1 includes a set of a time relationship between downlink data transmitted by a network device to the communications device through the PDSCH and a HARQ codebook that is of the downlink data and that is fed back by the communications device to the network device. A value of K0 includes a time relationship between downlink scheduling transmitted by the network device to the communications device through a PDCCH and the scheduled downlink data transmitted by the network device to the communications device.

With reference to the foregoing possible implementation, in a possible implementation of the second aspect, the communications device determines the quantity of PDCCHs based on the value set of K1 the value of K0 in the time domain resource allocation table, a physical downlink control channel PDCCH period, a PDCCH monitor offset, and a PDCCH monitor pattern.

With reference to the foregoing possible implementation, in a possible implementation of the second aspect, the communications device determines the HARQ codebook based on a smaller value between the quantity of PDSCHs and the quantity of PDCCHs.

With reference to the foregoing possible implementation, in a possible implementation of the first aspect or the second aspect, the time domain resource allocation table further includes at least one of time domain resource allocation information and a scheduling type.

With reference to the foregoing possible implementation, in a possible implementation of the first aspect or the second aspect, the scheduling type includes a first type and a second type. The first type indicates that the downlink data is transmitted through the PDSCH by using a slot as a transmission granularity, and the second type indicates that the downlink data is transmitted through the PDSCH by using a symbol as a transmission granularity.

According to a third aspect, an embodiment of this application provides a communication method. The method includes: receiving, by a network device, a HARQ codebook sent by a communications device.

In a possible implementation of the third aspect, the HARQ codebook is determined based on a quantity of PDCCHs and a quantity of PDSCHs.

In a possible implementation of the third aspect, the HARQ codebook is determined based on the quantity of PDSCHs.

With reference to the foregoing possible implementation, in a possible implementation of the third aspect, the network device sends a value set of K1 a value of K0 in a time domain resource allocation table, a physical downlink control channel PDCCH period, a PDCCH monitor offset, and a PDCCH monitor pattern to the communications device, to determine the quantity of PDCCHs.

With reference to the foregoing possible implementation, in a possible implementation of the third aspect, the network device sends the value set of K1 and the time domain resource allocation table to the communications device, to determine the quantity of PDSCHs.

According to a fourth aspect, an embodiment of this application provides an apparatus, including at least one processor and at least one memory. The processor is configured to perform the method in any one of the first aspect to the third aspect. The at least one memory is coupled to the at least one processor.

According to a fifth aspect, an embodiment of this application provides an apparatus, including at least one processor and at least one memory. The at least one memory is coupled to the at least one processor. The at least one memory is configured to store computer program code or a computer instruction. When one or more processors execute the computer program code or the computer instruction, the apparatus performs the method in any one of the first aspect to the third aspect.

According to a sixth aspect, an embodiment of this application provides an apparatus, including at least one processor. The processor is configured to perform the method in any one of the first aspect to the third aspect.

According to a seventh aspect, an embodiment of this application provides an apparatus, including at least one communications interface, configured to perform the receiving and sending steps in the method in any one of the first aspect to the third aspect. Further, the apparatus may further include at least one processor, configured to perform the processing steps in the method in any one of the first aspect to the third aspect. The at least one processor is coupled to the at least one communications interface. Optionally, the foregoing processing steps include a manner of determining a HARQ codebook, a quantity of PDCCHs, and/or a quantity of PDSCHs, and the like. Optionally, the foregoing receiving and sending steps include implementing information exchange inside the apparatus or implementing transmission between a network device and a communications device.

According to an eighth aspect, an embodiment of this application provides a computer storage medium, including a computer instruction. When the computer instruction is run on an apparatus, the apparatus is enabled to perform the method in any one of the first aspect to the third aspect.

According to a ninth aspect, an embodiment of this application provides a computer program product. When the computer program product is run on a computer, the computer is enabled to perform the method in any one of the first aspect to the third aspect.

According to a tenth aspect, an embodiment of this application provides a chip. The chip may exist in a form of an apparatus. The chip may be any apparatus in the fourth aspect to the ninth aspect.

For beneficial effects corresponding to the fourth aspect to the tenth aspect, refer to the related description of the beneficial effects of the first aspect to the third aspect. Details are not described herein again.

DETAILED DESCRIPTION OF ILLUSTRATIVE EMBODIMENTS

Figure 1:
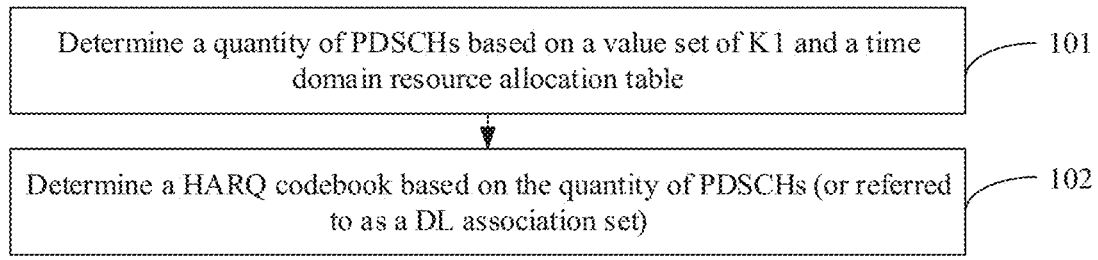
FIG. 1 is a flowchart of a communication method according to an embodiment of this application.

It should be noted that, in this application, the word "as an example" or "for example" is used to represent giving an example, an illustration, or a description. Any embodiment or design scheme described as an "as an example" or "for example" in this application should not be explained as being more preferred or having more advantages than another embodiment or design scheme. Exactly, use of the word "as an example" or "for example" or the like is intended to present a related concept in a specific manner.

In this application, "of (of)", "corresponding (relevant)", and "corresponding" may be used interchangeably in some cases. It should be noted with no emphasis on a difference between "of", "relevant", and "corresponding", meanings expressed are consistent.

In this application, the term "a plurality of" means two or more than two.

Terms "first", "second", and the like in this application are used only for differentiation, and are not intended to limit a sequence. For example, a first frequency domain resource and a second frequency domain resource are merely intended to distinguish between different frequency domain resources, but are not intended to limit a sequential order thereof. Identifiers representing quantities in this application such as English letters i, X, Y, S, C, m, n, Pc, a, b, Nc, and the like may be real numbers, and optionally, may be constants, positive integers, or the like.

For ease of understanding, the following uses examples to describe some concepts related to the embodiments of this application for reference.

Carrier: A carrier in the embodiments of this application includes any one or more combinations in the following: a carrier in a non-carrier aggregation (CA) scenario, a carrier in a CA scenario, a carrier in a multiple stream aggregation (MSA) scenario, a carrier in a non-MSA scenario, a carrier in a dual connectivity (dual connection) scenario, and a carrier in a non-DC scenario. The CC in the CA, MSA, or DC scenario may be referred to as a component carrier (CC), for example, including a primary CC or a secondary CC. A serving cell in the CA, MSA, or DC scenario may be a primary cell (PCell) or a secondary cell (SCell). For ease of description, in some scenarios in the embodiments of this application, the CC in the foregoing various scenarios may be understood as a cell. This is not limited in the embodiments of this application.

Numerology: a numerology is a parameter used by a communications system. The communications system (for example, 5G) may support a plurality of numerologies. The numerology may be defined by using one or more of the following parameter information: a subcarrier spacing, a cyclic prefix (CP), a time unit, bandwidth, and the like. The time unit may be used to represent a time length or a time unit in time domain, for example, a sampling point, a symbol, a mini-slot, a slot, a plurality of slots, a subframe, a radio frame, or a frame structure (frame). Time unit information may include a type, a length, or a structure of the time unit.

HARQ codebook: A receive end may feed back, by using uplink feedback information (for example UCI) to a transmit end, a decoding result of a plurality of pieces of data transmitted by the transmit end. The UCI may be transmitted through a physical uplink control channel (PUCCH) or a physical uplink shared channel (PUSCH). The plurality of pieces of data may be from different time units, different codewords of multi-input multi-output (multiple input multiple output, MIMO), different BWPs, and different carriers. The HARQ codebook is used to indicate a decoding result of the foregoing one piece or the plurality of pieces of data, or may also be referred to as a HARQ-ACK. A size of the HARQ codebook may be determined by using a quantity of occupied bits, for example, a quantity of bits occupied by the HARQ codebook in the UCI. The HARQ codebook may be indexed by using a correspondence between each quantity of bits and corresponding data transmitted by the transmit end.

Feedback form of a HARQ codebook: A dynamic form and a semi-static form are included. A quantity of bits of the HARQ codebook fed back in the dynamic form usually depends on an actual or current scheduling status. A quantity of bits of the HARQ codebook fed back in the semi-static form usually depends on a configuration parameter, and the configuration parameter may be carried by signaling such as high layer signaling.

HARQ timing sequence and scheduling timing sequence:

1. K0: Timing relationship between downlink scheduling and corresponding downlink data transmission (Timing between DL assignment and corresponding DL data transmission). Data sent by a transmit end to a receive end may be referred to as downlink data. The downlink scheduling such as downlink control information (DCI) may be sent by the transmit end to a receive end through a physical downlink control channel (PDCCH). Specifically, if the transmit end sends the DCI to the receive end in a time unit n through the PDCCH, a time unit corresponding to data that is scheduled by using the DCI and that is transmitted through the physical downlink shared channel (PDSCH) is n+K0. For ease of description, time units related to K0 are collectively referred to as a slot. However, the time units described in the embodiments of the present invention are not limited to a slot. Usually, the transmit end may configure a time domain resource allocation table or a PDSCH-symbol allocation table (as shown in FIG. 1). Each row in the time domain resource allocation table may include any one or more of one K0, time domain resource allocation information, and a scheduling type (also referred to as a PDSCH mapping type). The time domain resource allocation information may indicate a time domain resource, for example, indicate a start symbol and a quantity of symbols that are occupied by scheduled data, or indicate a time unit occupied by downlink data. For example, the time domain resource allocation information may be collectively encoded as a start length indication value (SLIV).

For example, a quantity of symbols included in one slot may be 14. A scheduling type A represents slot transmission, and a scheduling type B represents non-slot or mini-slot transmission. In addition, the transmit end may indicate, to the receive end by using the DCI, a specific row, in the time domain resource allocation table, to which a time domain resource allocated for the data transmission needs to correspond. In this way, the receive end may know a value of K0 and the time domain resource allocated by the transmit end for the data transmission. When the transmit end is a base station, and the receive end is a terminal, the base station may send the time domain resource allocation table to the terminal by using radio resource control (RRC) signaling. In addition, a value set may also be configured for K0, and K0 does not need exist in the time domain resource allocation table.

TABLE 1

| Index number index | K0 | Start symbol | Quantity of symbols | Scheduling type (PDSCH mapping type) |
| --- | --- | --- | --- | --- |
| 0 | 0 | 2 | 10 | A |
| 1 | 1 | 3 | 8 | A |

TABLE 1-continued

| Index number index | K0 | Start symbol | Quantity of symbols | Scheduling type (PDSCH mapping type) |
| --- | --- | --- | --- | --- |
| 2 | 0 | 4 | 7 | B |
| 3 | 3 | 2 | 10 | A |

2. K1: Timing relationship between downlink data transmission and a corresponding HARQ codebook feedback (Timing between DL data transmission and corresponding HARQ codebook). Specifically, if a transmit end sends downlink data to a receive end through a PDSCH in a time unit n, the receive end transmits uplink feedback information, such as uplink control information (UCI), corresponding to the downlink data to the transmit end in a time unit n+K1. Usually, the receive end transmits the UCI to the transmit end through a PUSCH or a PUCCH. When the transmit end is a base station, and the receive end is a terminal, the base station may preconfigure a value set of K1 for example, $\{1, 2, 3, 4\}$, and send the value set of K1 to the terminal by using RRC signaling. Then, the base station sends the DCI to the terminal, to notify the terminal of a specific value of K1 allocated for the data transmission in the set.

PDCCH location: A PDCCH location may also be referred to as a PDCCH monitor occasion. A base station needs to notify a terminal of a manner of monitoring a PDCCH, for example, location information of the PDCCH. Usually, the base station may configure, for the terminal by using RRC signaling, a PDCCH monitor period, a PDCCH monitor offset, and a PDCCH monitor pattern (pattern, or a monitor symbol) in one slot. For example, a monitor period configured by the base station for the terminal is 4 slots, a monitor offset is 2 slots, and a pattern is symbols 0 and 1, the terminal may regard two slots as an offset, monitor every four slots to determine whether there is a PDCCH, and know that locations of the PDCCHs are a slot 2, a slot 6, a slot 10, a slot 14, . . . , and, a slot 2+4n, where n is an integer, provided that the symbols 0 and 1 are monitored in the foregoing slots.

PDSCH location: A PDSCH location may also be referred to as a PDSCH occasion, and may be a PDSCH location that may be used to transmit downlink data. As shown in Table 2, a value 0 of K0 in a time domain resource allocation table is used as an example. The value 0 of K0 represents that a PDSCH and a PDCCH are in a same slot. As shown in Table 2, that one slot includes 14 symbols is used as an example. Based on a scheduling type B, that is, one or more PDSCHs can be scheduled in one slot, the terminal knows that four PDSCH locations in one slot can be used by a base station to send downlink data to the terminal, and are specifically symbols 0 and 1, symbols 4 and 5, symbols 8 and 9, and symbols 12 and 13. A slot set in which the PDSCH is located or a possible set of PDSCH occasions in which HARQ information can be fed back by using target UCI may also be referred to as a downlink association set (DL association set). For example, for UCI in a slot n, a corresponding DL association set is a slot n−K1.

TABLE 2

| Index number index | K0 | Start symbol | Quantity of symbols | Scheduling type (PDSCH mapping type) |
| --- | --- | --- | --- | --- |
| 0 | 0 | 0 | 2 | B |
| 1 | 0 | 4 | 2 | B |

TABLE 2-continued

| Index number index | K0 | Start symbol | Quantity of symbols | Scheduling type (PDSCH mapping type) |
|---|---|---|---|---|
| 2 | 0 | 8 | 2 | B |
| 3 | 0 | 12 | 2 | B |

Bandwidth: Bandwidth may be contiguous resources in frequency domain. The bandwidth sometimes may be referred to as a bandwidth part (BWP), a carrier bandwidth part, subband bandwidth, narrowband bandwidth, or another name. A name is not limited in this application. For example, one BWP includes K (K>0) contiguous subcarriers; or one BWP is a frequency domain resource including N contiguous resource blocks (RBs) that do not overlap each other, a subcarrier spacing of the RB may be 15 kHz, 30 kHz, 60 kHz, 120 kHz, 240 kHz, 480 kHz, or another value. Alternatively, one BWP is a frequency domain resource including M contiguous resource block groups (RBGs) that do not overlap each other, and one RBG includes P contiguous RBs. A subcarrier spacing of the RB may be 15 kHz, 30 kHz, 60 kHz, 120 kHz, 240 kHz, 480 kHz, or another value such as an integral multiple of 2. For example, one or more BWPs may be configured for one carrier or cell. The foregoing value set of K1 and the time domain resource allocation table (or may also be referred to as a PDSCH-symbol allocation table) may be configured for each BWP. For example, a set 1 of K1 and a time domain resource allocation table (or may also be referred to as a PDSCH-symbol Allocation table 1) 1 are configured for a BWP 1. A set 2 of K1 and a time domain resource allocation table (or may also be referred to as a PDSCH-symbol Allocation table) 2 are configured for a BWP 2. A PDCCH monitor occasion of one carrier or cell may be a set/union set (super-set) of PDCCH monitor occasions of all BWPs configured or activated for the carrier or the cell. Alternatively, a PDSCH occasion (or a DL association set) of one carrier or cell may be a set/union set (super-set) of PDSCH occasions (or DL association sets) of all BWPs configured or activated for the carrier or the cell.

In the embodiments of the present invention, unless otherwise specified, one cell and one BWP are used as an example for description. A similar status is also applicable to a case of a plurality of cells and/or a plurality of BWPs. Details are not described herein again.

Figure 2:
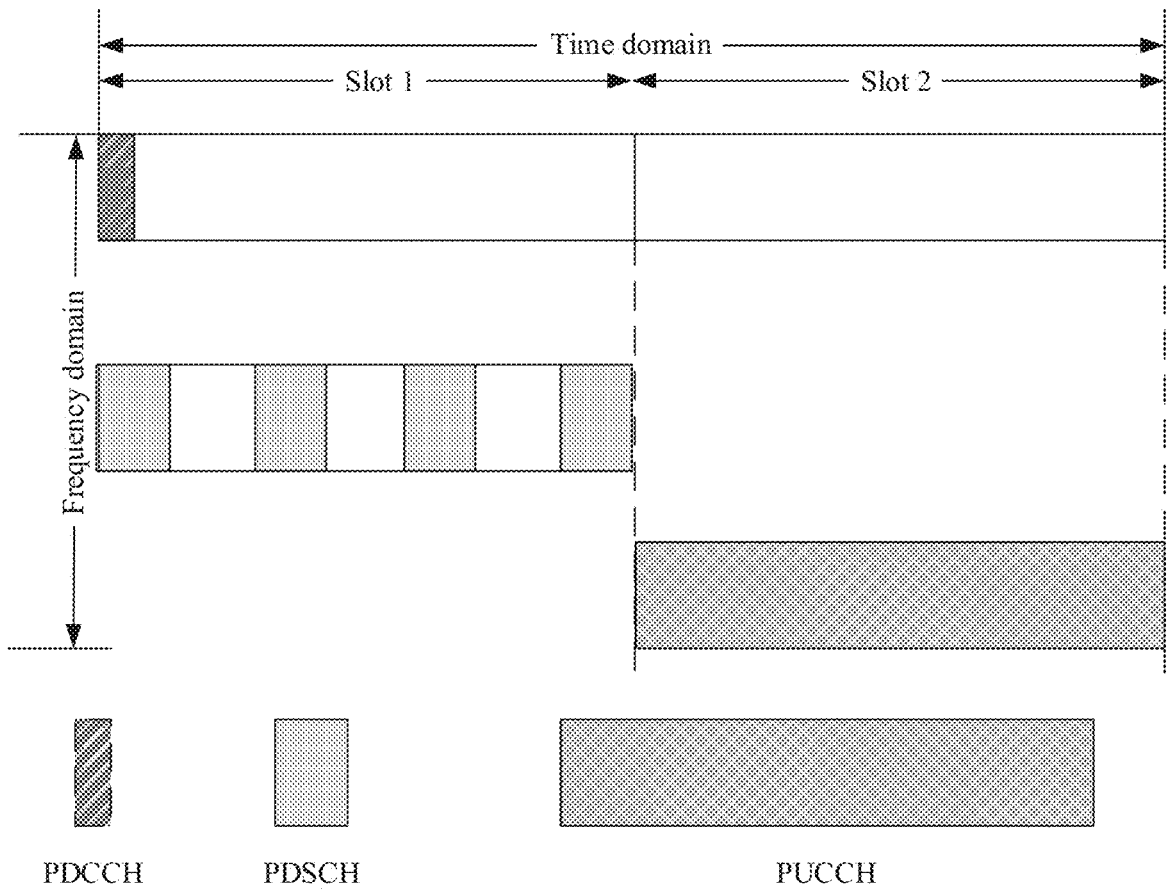
FIG. 2 is a schematic diagram of time-frequency domain of a communication method according to an embodiment of this application.
Figure 4:
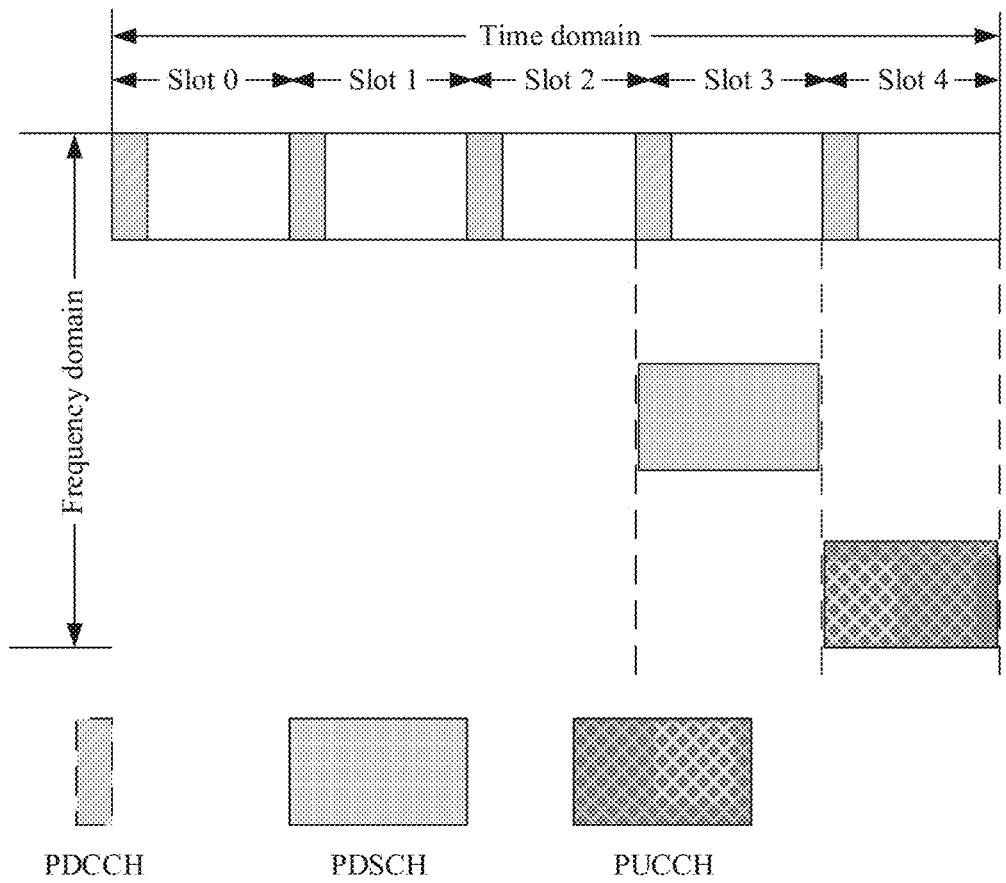
FIG. 4 is a schematic diagram of time-frequency domain of a communication method according to an embodiment of this application.

The embodiments of the present invention, unless otherwise specified, may be applied to time division duplex (TDD) or frequency division duplex (FDD). For example, FIG. 2 or FIG. 4 shows the frequency division duplex. To be specific, a PDSCH, a PDCCH, and a PUCCH are separately located in different frequency domain resources. However, the embodiments of the present invention may also be applied to the time division duplex. To be specific, a PDSCH, a PDCCH, and a PUCCH may be located in a same frequency domain resource.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

A communications device related to the embodiments of this application may be a device used to transmit or process data/signaling in a communications system. For example, the communications device may be a terminal, and may be specifically user equipment (UE), an access terminal, a terminal unit, a terminal station, a mobile station, a mobile station, a remote station, a remote terminal, a mobile device, a wireless communications device, a terminal agent, a terminal apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, or a terminal in a future evolved PLMN network. For ease of description, the communications device or the receive end in the embodiments of the present invention may be collectively referred to as a terminal.

The network device related to the embodiments of this application may be a device used to transmit or process data/signaling. For example, the network device may be a base station, a relay node, an access point, or the like. The base station may be a base transceiver station (BTS) in a global system for mobile communications (GSM) or a code division multiple access (CDMA) network, or an NB (NodeB) in wideband code division multiple access (WCDMA), or an eNB or eNodeB (Evolved NodeB) in LTE. The network device may also be a wireless controller in a cloud radio access network (CRAN) scenario. The network device may also be a gNB in a 5G network, a network device in a future evolved PLMN network, or the like. For ease of description, the network device or the transmit end in the embodiments of the present invention may be collectively referred to as a base station.

It should be noted that in the embodiments of this application, unless otherwise specified, the transmission may refer to both uplink sending and downlink receiving. The uplink sending may be understood that the communications device sends uplink data and/or signaling to the network device, and the downlink receiving may be understood that the communications device receives downlink data and/or signaling sent by the network device.

Referring to FIG. 1, an embodiment of this application provides a communication method. The method may include the following steps:

101. Determine a quantity of PDSCHs (or referred to as a DL association set) based on a value set of K1 and a time domain resource allocation table.

102. Determine a HARQ codebook based on the quantity of PDSCHs (or referred to as the DL association set).

For example, the step 101 and 102 may be performed by a communications device, a terminal, or a chip.

In this embodiment of the present invention, the quantity of PDSCHs may be understood as a quantity of PDSCH occasions. For example, a base station may send a PDSCH occasion set of downlink data to a terminal, or the terminal may determine the PDSCH occasion set based on a parameter such as the value set of K1 preconfigured by the base station or sent by the base station by using RRC signaling and/or some or all pieces of information in the time domain resource allocation table. Feedback information of the PDSCH may be fed back in same UCI. A quantity of PDCCHs may be understood as a quantity of PDCCH monitor occasions, namely a PDCCH occasion set in which a PDCCH used by the base station to send downlink scheduling information to the terminal is located. Feedback information of the PDSCH scheduled by using the PDCCH may be fed back in same UCI.

That the terminal determines the quantity of PDSCHs based on the value set of K1 and the time domain resource allocation table may be understood as that the terminal determines the quantity of PDSCHs based on at least one piece of information included in the time domain resource allocation table and the value set of K1. For example, the terminal determines the quantity of PDSCHs based on time domain resource allocation information in the time domain resource allocation table and the value set of K1 or determines the quantity of PDSCHs based on a scheduling type in the time domain resource allocation table and the value set of K1 or determines the quantity of PDSCHs based on a scheduling type and time domain resource allocation information in the time domain resource allocation table and the value set of K1. For example, the value set of K1 includes a value set of a time relationship between downlink data transmitted by the network device to the communications device through a PDSCH and a HARQ codebook, of the downlink data, fed back by the communications device to the network device.

For example, a value of K0 is a value of a time relationship between downlink scheduling transmitted by the network device to the communications device through a PDCCH and scheduled downlink data transmitted by the network device to the communications device.

Further, the method may include: receiving, by the terminal, a value set of K1 and a time domain resource allocation table that are sent by the base station.

For example, the base station may configure the value set of K1 and the time domain resource allocation table for the terminal by using RRC signaling. The value set of K1 and the time domain resource allocation table may be configured based on a BWP. The RRC signaling used to configure the value set of K1 and the time domain resource allocation table may be same signaling or different signaling.

In addition, the value set of K1 and the time domain resource allocation table in step 101 may have one or more of the following possible cases.

Case 1: The value set of K1 is a union set of a first set and a second set. The second set may be a value set of K1 used for scheduling using fallback DCI or fallback DCI such as DCI format 1_0 in common search space. Because the fallback DCI may be used before an RRC connection is established, a value set of K1 corresponding to the fallback DCI is usually not configured by using RRC signaling, or may be predefined by a system (such as an access network device, a core network device, or a base station) or configured by using remaining minimum system information (RMSI). The first set may be a value set of K1 that is configured by using RRC signaling and that is used for scheduling using non-fallback DCI such as DCI format 1_1, or that is used for scheduling using fallback DCI in terminal specific search space. That a PDSCH occasion or a PDCCH occasion may be scheduled by using the fallback DCI or may be scheduled by using the non-fallback DCI needs to be considered in a process of determining the PDSCH occasion and/or the PDCCH occasion. Therefore, it is determined that the K1 used for the HARQ codebook is a union set of the first set and the second set. For example, the first set is {1, 2}, and the second set is {2, 3, 4}, so that the value set of K1 is {1, 2, 3, 4}. Optionally, the value set of K1 may also be a union set of a first set, a second set, and a third set. The third set is a value set of K1 used before an RRC connection is established.

In addition to the value set of K1 optionally, the time domain resource allocation table may also be a union set of a first time domain resource allocation table and a second time domain resource allocation table. The first time domain resource allocation table is used for scheduling using non-fallback DCI, for example, configured for each BWP by using RRC signaling. The second time domain resource allocation table is used for scheduling using fallback DCI, for example, configured by using RMSI or predefined by a system.

Case 2: A value set of K1 and a time domain resource allocation table that are configured by using RRC signaling have a higher priority than a value set of K1 and a time domain resource allocation table that are configured by using RMSI or predefined by a system. In other words, the value set of K1 and the time domain resource allocation table that are configured by using RRC signaling may replace a first value set of K1 and a first time domain resource allocation table. In this way, it can be determined that a value set of K1 used by a HARQ-ACK codebook may be the first set, and/or a time domain resource allocation table used by a HARQ-ACK codebook may be the first time domain resource allocation table.

Case 3: It is determined that a value set of K1 and/or a time domain resource allocation table that are/is used in feedback information of a specific cell or BWP is related to configuration of PDCCH search space of the cell or BWP or configuration of a DCI format, that needs to be monitored, of the cell or BWP. For example, it is assumed that only common search space is configured for a specific cell or BWP (optionally, especially in a case in which cross-BWP scheduling or cross-carrier scheduling is not supported), there is no need to monitor DCI format 1_1 (because the DCI format 1_1 may be located in only UE specific search space). In this case, the value set of K1 is a second set, and/or the time domain resource allocation table is a second time domain resource allocation table. For another example, UE specific search space is configured for a specific cell or BWP, only fallback DCI needs to be monitored in the UE specific search space, and there is no need to monitor DCI format 1_1. In this case, the value set of K1 is a second set or a first set, and/or the time domain resource allocation table is a second time domain resource allocation table or a first time domain resource allocation table. For still another example, only UE specific search space is configured for a specific cell or BWP (optionally, specifically in a case in which cross-BWP scheduling or cross-carrier scheduling is not supported), only non-fallback DCI needs to be monitored in the UE specific search space, and there is no need to monitor the fallback DCI. In this case, a DL association set or HARQ feedback information for the cell or BWP is determined provided that the value set of K1 is the first set, and/or the time domain resource allocation table is the first time domain resource allocation table.

Further, the method may include: sending, by the terminal, a HARQ codebook to the base station.

In the embodiments of the present invention, time domain resource allocation information indicates a time domain resource occupied by a PDSCH. For example, the time domain resource allocation information includes a start symbol and a symbol length that are corresponding to a PDSCH used to transmit downlink data.

The scheduling type may be a first type and/or a second type. The first type may be referred to as a type A, and the second type may be referred to as a type B. For example, the type A is usually used to transmit downlink data through a PDSCH by using a slot as a minimum unit. Specifically, when the scheduling type is A, one slot is usually corresponding to one PDSCH, to transmit downlink data. The type B is usually used to transmit downlink data through a PDSCH by using non-slot, a mini slot, or a symbol as a minimum unit. Specifically, when the scheduling type is B, one slot is usually corresponding to a plurality of PDSCHs, to transmit downlink data. In other words, one or several symbols may be corresponding to one PDSCH. The minimum unit of the foregoing scheduling type may be any time unit as defined above. Optionally, the type A indicates that the downlink data is transmitted through the PDSCH by using a slot as a transmission granularity. The type B indicates that the downlink data is transmitted through the PDSCH by using a symbol as a transmission granularity. The following specifically describes a specific implementation in which the terminal determines the quantity of PDSCHs as shown in FIG. 2.

In all embodiments of the present invention, at least one PDSCH and at least one PDCCH may be located in one or more carriers.

It is assumed that a PDCCH period is one slot (that is, the PDCCH needs to be monitored in each slot). The value set of K1 includes only a value 1, and the time domain resource allocation table is shown in Table 3.

TABLE 3

| Index number index | K0 | Start symbol | Quantity of symbols | Scheduling type (PDSCH mapping type) |
|---|---|---|---|---|
| 0 | 0 | 0 | 2 | B |
| 1 | 0 | 4 | 2 | B |
| 2 | 0 | 8 | 2 | B |
| 3 | 0 | 12 | 2 | B |

It can be learned from Table 3, a value of K0 is 0. It is assumed that the PUCCH is corresponding to a slot 2, the terminal may send, to the base station, a HARQ codebook through the PUCCH in the slot 2. The HARQ codebook is used by the terminal to indicate a receiving status of downlink data to the base station. Because a value of K1 is 1, UCI in the slot 2 may include feedback information of downlink data transmitted through the PDSCH in a slot 1. Further, because a value set of K0 is 0, a PDCCH occasion in which a PDCCH that may be used to schedule the PDSCH is possibly located in the slot 1. If a configured PDCCH monitor pattern is that the terminal only needs to perform monitoring in a first symbol, a quantity of PDCCH occasions that need to be monitored by the terminal is 1 (DCI may be used to schedule the PDSCH in the PDCCH occasions and a HARQ codebook of the PDSCH may be fed back in the slot 2).

As shown in Table 3, because the scheduling type is the type B, a HARQ codebook sent by the terminal to the base station in the slot 2 may include feedback information corresponding to four PDSCH occasions (transmission in four mini-slots or non-slot transmission in the slot 1), respectively corresponding to symbols 0 and 1, symbols 4 and 5, symbols 8 and 9, and symbols 12 and 13. In this case, the terminal needs to generate HARQ feedback information for the four PDSCH occasions.

Specifically, the terminal may generate X bits of HARQ feedback information for each PDSCH occasion, and X is a quantity of bits that need to be used for a feedback for one PDSCH. For example, a transport block (TB) is a data block for downlink transmission. In configuration of one TB or codebook, one bit needs to be used for a feedback for one PDSCH (corresponding to a decoding result of the TB). In configuration of two TBs or codewords, a bundling operation is not performed, two bits need to be used for a feedback for one PDSCH (corresponding to a decoding result of the two TBs). In configuration of two TBs or codewords, a bundling (operation is performed, one bit needs to be used for a feedback for one PDSCH (corresponding to a decoding result of the two TBs and an operation result). A CBG feedback is configured, and N bits are used for a feedback for each TB. For example, it is assumed that a quantity of PDSCH occasions is 4, when one TB is configured, a quantity of bits of the HARQ codebook is 4, and when two TBs are configured and a bundling operation is not performed, a quantity of bits of the HARQ codebook is 8.

If PDSCH transmission is monitored in an $i^{th}$ PDSCH occasion, X bits of feedback information generated based on the foregoing method is at a corresponding location (for example an $i^{th}$ location). If PDSCH transmission is not monitored, a corresponding location (for example an $i^{th}$ location) is filled with a NACK of X bits by default.

Optionally, the terminal determines the PDSCH occasion in the following manners.

It is assumed that a plurality of rows in the time domain resource allocation table are rows in which the scheduling type is the type A, it may be understood that one slot is corresponding to one PDSCH occasion. Because only one PDSCH whose scheduling type is the type A can be scheduled in one slot, the terminal enables the foregoing plurality of types A to be corresponding to one PDSCH occasion. Specifically, as shown in Table 1, when scheduling types corresponding to index numbers 0, 1, 3 each are A, the three rows are counted as one PDSCH occasion. Alternatively, considering cross-slot scheduling, a quantity of PDSCHs whose scheduling type is the type A in one slot may be a quantity of values of K0 in rows in which the scheduling type is the type A in the table. For example, a value of K0 in rows in which the scheduling type is the type A in Table 4 may be {0, 1}, and therefore a quantity of PDSCHs whose scheduling type is the type A in two slots is 2.

There are a plurality of rows in which the scheduling type is the type B in the time domain resource allocation table. It may be understood that one slot is corresponding to a plurality of PDSCH occasions. If a PDSCH corresponding to a time allocation unit a is scheduled, optionally, a PDSCH corresponding to a time allocation unit b that overlaps the time allocation unit a cannot be scheduled. Therefore, the terminal accumulates a quantity of PDSCHs whose scheduling type is the type B in time allocation units that do not overlap. The time allocation unit may be a time length occupied by several symbols. For example, time units respectively corresponding to two PDSCHs are symbols 1 to 5 and symbols 1 to 8, and data is usually transmitted through one PDSCH in the two time units. Therefore, PDSCHs respectively corresponding to the symbols 1 to 5 and the symbols 1 to 8 are counted as one PDSCH occasion. The following describes four examples in which the PDSCH occasion is determined. However, this is not construed as a limitation.

Example 1: A possible quantity of PDSCHs whose scheduling type is the type B in one slot is a quantity of rows in which start symbols are different and the scheduling type of PDSCH occasions is the type B in the table. For example, in Table 4, if a PDSCH whose scheduling type is the type A is configured, a quantity of PDSCHs whose scheduling type is the type A is only counted as one, and a quantity of PDSCHs whose scheduling type is the type B is counted as three (respectively corresponding to start symbols 0, 4, and 8). Therefore, a possible quantity of PDSCHs in one slot is 4. Codebook orchestration may be first performed for the PDSCH whose scheduling type is the type A and may be then performed for the PDSCH whose scheduling type is the type B, or vice versa. When orchestration of HARQ feedback information of the PDSCH whose scheduling type is the type B is performed, the orchestration may be performed based on start symbols of the PDSCH. For example, orchestration of feedback information of a PDSCH whose start symbol is 0 is first performed, and then orchestration of feedback information of a PDSCH whose start symbol is 4 is performed, and finally orchestration of feedback information of a PDSCH whose start symbol is 8 is performed.

TABLE 4

| Index number index | K0 | Start symbol | Quantity of symbols | Scheduling type (PDSCH mapping type) |
| --- | --- | --- | --- | --- |
| 0 | 0 | 0 | 2 | B |
| 1 | 0 | 0 | 4 | B |
| 2 | 0 | 4 | 2 | B |
| 3 | 0 | 4 | 7 | B |
| 4 | 0 | 8 | 2 | B |
| 5 | 0 | 2 | 12 | A |
| 6 | 1 | 3 | 12 | A |

Example 2: A possible quantity of PDSCHs in rows in which the scheduling type is the type B, and start numbers do not overlap is counted. For example, in the table above, rows in which start symbols do not overlap are respectively: a corresponding row in which an index is equal to 0, a row in which an index is equal to 2, and a row in which an index is equal to 4. Therefore, a quantity of PDSCHs whose scheduling type is the types B is counted as 3. Orchestration may be performed in an order of time at which the DCI is monitored, or may be performed in an order of time at which the start symbols of the PDSCH are monitored.

Example 3: Considering that a plurality of PDSCHs may be simultaneously used for transmission at a same moment, a simplest manner is that a quantity of PDSCH occasions in one slot is counted as a quantity of rows in the time domain resource allocation table. A codebook is orchestrated according to indexes corresponding to the PDSCH occasions, for example but not limited to, in an ascending order. To be specific, HARQ feedback information of the PDSCH whose index is equal to 0 is ranked before HARQ feedback information of the PDSCH whose index is equal to 1 (if transmission of the PDSCH whose index is equal to i is not monitored, a location corresponding to the index of i is filled with a NACK by default). Optionally, if the terminal monitors transmission of a plurality of PDSCHs with a same index (for example, an index is equal to i) in a same slot, only HARQ information of the PDSCH whose index is equal to i and that is scheduled by using the earliest DCI or the latest DCI is fed back at a location corresponding to the index of i, or only feedback information of the PDSCH whose index is equal to i and that has a minimum or a maximum RB index is fed back at a location corresponding to the index of i. Therefore, this can ensure that the terminal and the base station have a same understanding of both the codebook orchestration and information.

To reduce overheads, optionally, a quantity of rows in which the scheduling type is the type A may be counted as 1 (or not counted repeatedly), or optionally, a quantity of rows in which start symbols are the same and quantities of symbols (or an SLIV) are the same are counted as 1 (or not counted repeatedly). The codebook orchestration is performed based on a minimum index value or a maximum index value of index values that are in the table and that are corresponding to the SLIV value, or the start symbol and a value of the symbol (similarly, optionally, if the terminal monitors transmission of a plurality of PDSCHs with a same SLIV, or same start symbols and a same quantity of symbols in one slot, only HARQ information of the PDSCH scheduled by using the earliest DCI or the latest DCI is fed back at a corresponding location, or only feedback information of the PDSCH with a minimum or a maximum RB index is fed back at a corresponding location. This can ensure that the terminal and the base station have a same understanding of both the codebook orchestration and information). Alternatively, optionally, a quantity of rows in which the scheduling type is the type A, start symbols are the same and quantities of symbols (or the SLIV value) are the same are counted as 1. A similar codebook orchestration rule is used, and details are not described herein again; and/or, optionally, a quantity of rows in which the scheduling type is the type B, start symbols are the same and quantities of symbols (or the SLIV value) are the same are counted as 1 (or not counted repeatedly). A similar codebook orchestration rule is used, and details are not described herein again.

Example 4: Considering processing complexity and feedback overheads of the terminal, it can be stipulated that a maximum quantity X of (X is a positive integer) PDSCHs (or PDSCHs whose scheduling type is the type B) exist in one slot. In this case, a slot set in which a PDSCH occasion exists is determined based on the value set of K1. A quantity of PDSCH occasions in each slot in the set is X (or X+1, assuming that one type A needs to be independently considered). Optionally, X pieces of HARQ feedback information in HARQ feedback information in each slot are corresponding to feedback information of X PDSCHs (or X PDSCHs whose scheduling type is the type B) in the slot that have a minimum SLIV value or a maximum SLIV value (optionally, if a plurality of SLIV values are the same, the same SLIVs are counted as one). If Y PDSCHs are monitored, and Y is less than X (or X PDSCHs whose scheduling type is the type B are monitored), X-Y locations are correspondingly filled with NACKs. Alternatively, optionally, X pieces of HARQ feedback information in HARQ feedback information in each slot are corresponding to feedback information of X PDSCHs (or X PDSCHs whose scheduling type is the type B) in the slot that have a minimum index value or a maximum index value (optionally, if a plurality of rows in which start symbols and/or end symbols corresponding to indexes are the same, a quantity of PDSCHs in the slot is counted as only one, a maximum index value or a minimum index value is used as an index value). If Y PDSCHs are monitored, and Y is less than X (or X PDSCHs whose scheduling type is the type B are monitored), X-Y locations are correspondingly filled with NACKs. Alternatively, optionally, X pieces of HARQ feedback information in the HARQ feedback information in each slot are corresponding to feedback information of X PDSCH occasions (or X PDSCHs whose scheduling type is the type B) that are in the slot and in which data or DCI is first (or last) monitored. If Y PDSCHs are monitored, and Y is less than X (or X PDSCHs whose scheduling type is the type B are monitored), X-Y locations are correspondingly filled with NACKs. Alternatively, optionally, X pieces of HARQ feedback information in the HARQ feedback information in each slot are corresponding to feedback information of X PDSCHs (or X PDSCHs whose scheduling type is the type B) that are in the slot and whose start symbol is the earliest or end symbol is the latest (optionally, PDSCH occasions with a same start symbol or a same end symbol are counted as one). If Y PDSCHs are monitored, and Y is less than X (or X PDSCHs whose scheduling type is the type B are monitored), X-Y locations are correspondingly filled with NACKs.

It should be noted that, for the type B, a reference point of the start symbol may be a first symbol in the slot. Therefore, for the first row, a value of the start symbol is 0. In addition, for the type B, a reference point of the start symbol may also be a first symbol of a resource set for PDCCH transmission. Therefore, for the first row, a value of the start symbol is 0. It is assumed that the first symbol of the resource set for PDCCH transmission may be 0 and 7, the first row is corresponding to two possible PDSCH occasions, and the start symbols are respectively 0+0 and 0+7.

In this embodiment of the present invention, an orchestration sequence of the HARQ codebook (feedback information of the PDSCH or feedback information of the PDSCH whose scheduling type is the type B) may be determined based on a start location of a time unit corresponding to the PDSCH or an SLIV value (or a start location and a length), or a sequence of index values in the table. The start locations may be in an ascending order or in a descending order. For example, that the orchestration sequence is determined in an ascending order of start locations corresponding to the PDSCH is used as an example. For the type B, it is assumed that in one slot, there are three time units in each of which the PDSCH exists, and the three time units are respectively symbols 1 to 6, symbols 2 to 8, and symbols 10 to 12. In an implementation, a HARQ codebook of the PDSCH in the symbols 1 to 6 is orchestrated, and then a HARQ codebook of the PDSCH in the symbols 10 to 12 is orchestrated. In another implementation, a HARQ codebook of the PDSCH in the symbols 2 to 8 is orchestrated, and then a HARQ codebook of the PDSCH in the symbols 10 to 12 is orchestrated. The foregoing orchestration sequence of the HARQ codebook may be understood as a sequence in which the terminal generates the HARQ codebook or a sequence in which the base station obtains the HARQ codebook. Optionally, if a plurality of PDSCHs with a same start location, or a plurality of PDSCHs with a same SLIV value (or a same start location and length) in the table, or a plurality of PDSCHs with a same index value in the table are monitored in one slot, only feedback information of the PDSCH that is in the plurality of PDSCHs and that is scheduled by using earliest or latest monitored DCI is fed back at a corresponding location. Alternatively, only HARQ feedback information of the PDSCH that is in the plurality of PDSCHs and that is used for earliest or latest transmission in time domain or frequency domain is fed back at a corresponding location. In the foregoing rule or manner, it can be ensured that a receive end and a transmit end have a same understanding on a size of the codebook and the orchestration, thereby improving communication robustness.

For example, the value set of K1 and the table are configured based on the BWP, and usually a plurality of BWPs may be configured for one cell (or a carrier). Therefore, one cell is used as an example, a total quantity Nc of PDSCH occasions for the cell is related to a BWP configuration/activation status. For example, a possible PDSCH occasion may be determined for each configured or activated BWP in the foregoing manner. The PDSCH occasion may be a union set or an intersection set of PDSCH occasions of the BWP configured or activated for the cell. For another example, the value set of K1 configured by using RRC signaling is a union set or an intersection set of a value set of K1 configured by using RRC signaling or configured based on the activated BWP for the cell, the table configured by using RRC signaling is a union set or an intersection set of a table configured by using RRC signaling or configured based on the activated BWP for the cell, and then a PDSCH occasion of the cell is determined. In a case of a plurality of carriers, for a determining manner of a PDSCH occasion and feedback information of each cell, refer to the above description, a final fed back HARQ codebook may include HARQ feedback information of all cells configured or activated by the terminal. How to specifically orchestrate HARQ feedback information of each cell is not limited in the present invention.

Optionally, in the foregoing process of determining the PDSCH occasion, K0 and a PDCCH period, and a PDCCH monitor offset and a PDCCH monitor pattern may be further considered, to ensure that a PDSCH occasion in which the PDCCH is used for scheduling is an effective PDSCH occasion, and HARQ information is fed back. For example, for a PDSCH occasion in a slot n, a value of K0 may be only 4, a PDCCH that probably schedules the PDSCH is located in only slot n−4. Because according to a configured PDCCH period and PDCCH monitor offset (offset), there is no PDCCH monitor occasion in the slot n−4. Therefore, the slot n cannot be a part of a DL association set.

In a case in which the HARQ codebook is determined based on the quantity of PDSCHs, a possibility that the PDSCH is scheduled is considered. This helps the terminal effectively generate the HARQ codebook, to ensure normal communication with the base station.

According to another aspect, the foregoing solution may also be applicable to a scenario in which a plurality of PDSCHs are corresponding to one slot, so as to implement air interface flexible scheduling.

Figure 3:
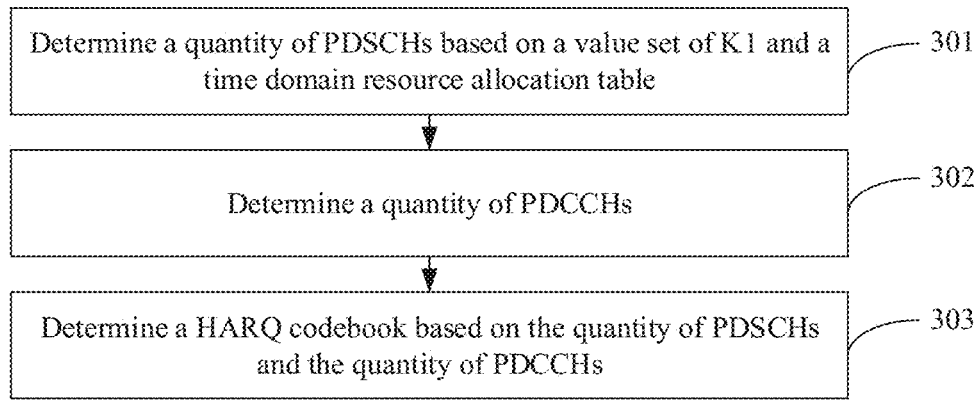
FIG. 3 is a flowchart of another communication method according to an embodiment of this application.

The following describes another embodiment of the present invention, in this embodiment, same or similar steps, functions, and term explanations similar to that of the foregoing embodiments, reference may be made to the foregoing embodiments. As shown in FIG. 3, the communication method includes the following steps:

301. Determine a quantity of PDSCHs based on a value set of K1 and a time domain resource allocation table.

302. Determine a quantity of PDCCHs.

303. Determine a HARQ codebook based on the quantity of PDSCHs and the quantity of PDCCHs.

For example, the foregoing determining step may be performed by a terminal, a chip, or a communications device.

A time sequence of determining the quantity of PDSCHs and determining the quantity of PDCCHs is not limited in this embodiment of the present invention. Specifically, the quantity of PDSCHs may be determined before, at the same time, or after the quantity of PDCCHs is determined.

In this embodiment of the present invention, for steps of determining, by the terminal, the quantity of PDSCHs based on the value set of K1 and the time domain resource allocation table, refer to the specific description in the foregoing embodiment. Details are not described herein again.

For example, the terminal determines the quantity of PDCCHs based on any one of the following:

a value set of K1 a value of K0 in a time domain resource allocation table, a PDCCH period, a PDCCH monitor offset, and a PDCCH monitor pattern. Specifically, the terminal determines the quantity of PDCCHs based on the value set of K1 the value of K0 in the time domain resource allocation table, the PDCCH period, the PDCCH monitor offset, and the PDCCH monitor pattern.

With reference to FIG. 4, the following describes in detail a specific implementation in which the terminal determines the quantity of PDCCHs.

Figure 5:
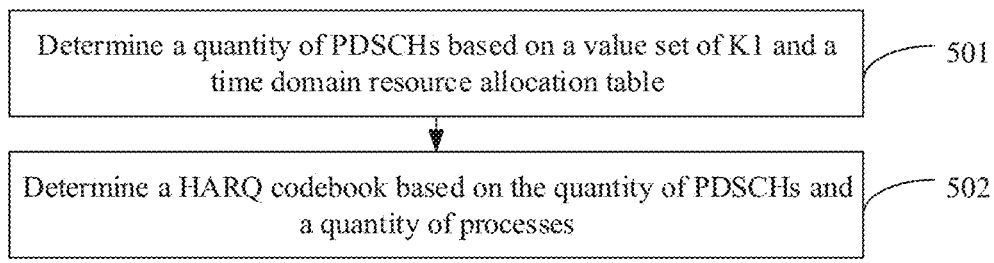
FIG. 5 is a flowchart of still another communication method according to an embodiment of this application.

It is assumed that the PDCCH period is one slot, the time domain resource allocation table is shown in FIG. 5, and the terminal may monitor whether there is a PDCCH in each slot.

TABLE 5

| Index number index | K0 | Start symbol | Quantity of symbols | Scheduling type |
|---|---|---|---|---|
| 0 | 0 | 2 | 10 | A |
| 1 | 1 | 3 | 8 | A |
| 2 | 2 | 4 | 7 | A |
| 3 | 3 | 2 | 10 | A |

As shown in FIG. 5, a value set of K0 is {0, 1, 2, 3}, and it is assumed that the value set of K1 includes only 1. When the terminal needs to feed back a HARQ codebook through a PUCCH corresponding to a slot 4, because a value of K1 is 1, the HARQ codebook may include HARQ feedback information of data transmitted through a PDSCH in a slot 3. Because a value of K0 is {0, 1, 2, 3}, it is assumed that a quantity of PDCCH occasions in each slot determined based on the PDCCH monitor pattern is 1, a quantity of PDCCH occasions in which the PDSCH in the slot 3 can be scheduled is 4, and the four PDCCH occasions are respectively a slot 3 (K0=0), a slot 2 (K0=0), a slot 1 (K0=2), and a slot 0 (K0=3). Therefore, a quantity of PDCCH occasions that need to be monitored by the terminal is 4.

In this case, the terminal needs to generate HARQ feedback information for the four PDCCH occasions.

For example, the terminal may generate X bits of HARQ feedback information for each PDCCH occasion, and X is a quantity of bits that need to be used for a feedback for one PDSCH. For example, a transport block (TB) is a data block for downlink transmission. In configuration of one TB or codebook, one bit needs to be used for a feedback in one PDSCH (corresponding to a decoding result of the TB). In configuration of two TBs or codewords, a bundling operation is not performed, and two bits need to be used for a feedback for one PDSCH (corresponding to a decoding result of the two TBs). In configuration of two TBs or codewords, a bundling operation is performed, and one bit needs to be used for a feedback for one PDSCH (corresponding to a decoding result and an operation result of the two TBs). A CBG feedback is configured, and N bits are used for a feedback for each TB. For example, it is assumed that a quantity of PDSCHs is 4, when one TB is configured, a quantity of bits of the HARQ codebook is 4, and when two TBs are configured and a bundling operation is not performed, a quantity of bits of the HARQ codebook is 8.

For an $i^{th}$ PDCCH occasion, if a PDCCH that is used to schedule transmission of a PDSCH (for example, DCI format 1_1 or DCI format 1_0) is monitored, X bits of feedback information of the PDSCH, scheduled by the DCI, generated in the foregoing manner is at a corresponding location (for example, an $i^{th}$ location). If a PDCCH used to schedule a PDSCH for transmission is not monitored (for example, DCI format 1_1 or DCI format 1_0), a corresponding location (for example, an $i^{th}$ location) is filled with a NACK of X bits by default.

One possibility is that the terminal determines the HARQ codebook based on the quantity of PDCCHs. When the quantity of PDCCHs is greater than the quantity of PDSCHs, an air interface resource may be wasted. Therefore, the quantity of PDCCHs and the quantity of PDSCHs are comprehensively considered in this solution. This helps effectively feed back the HARQ codebook.

Further, in this embodiment of the present invention, the terminal determines HARQ feedback information of a cell based on a smaller value min {the quantity of PDSCHs, the quantity of PDCCHs}, to reduce a quantity of bits occupied by the HARQ codebook and reduce air interface overheads.

For example, when the quantity of PDSCHs is less than the quantity of PDCCHs (or more generally, a product of C and the quantity of PDSCHs is less than a product of S and the quantity of PDCCHs, and S and C are real numbers), the communications device determines the HARQ codebook based on the quantity of PDSCHs.

Alternatively, when the quantity of PDSCHs is greater than the quantity of PDCCHs (or more generally, a product of C and the quantity of PDSCHs is greater than a product of S and the quantity of PDCCHs, and S and C are real numbers), the communications device determines the HARQ codebook based on the quantity of PDCCHs.

Alternatively, when the quantity of PDSCHs is equal to the quantity of PDCCHs (or more generally, a product of C and the quantity of PDSCHs is equal to a product of S and the quantity of PDCCHs, and S and C are real numbers), the communications device determines the HARQ codebook based on the quantity of the PDSCHs or the quantity of PDCCHs.

Optionally, a possibility that there are a plurality of pieces of DCI exist in one PDCCH occasion may be considered. For example, in a PDCCH occasion in the slot 1, a PDSCH (K0=0) in a slot 1 is scheduled by using DCI 1, and a PDSCH (K0=1) in a slot 2 is scheduled by using DCI 2. For example, with a limitation, a maximum quantity S (S is a positive integer) of pieces of DL DCI exist in one PDCCH occasion. HARQ codebooks of PDSCHs scheduled by using the S pieces of DCI may be orchestrated according to a time sequence in which the PDSCH appears or a time sequence of search space in which the DCI is located, for example, in an ascending order of search space numbers or a descending order of search space numbers, where the numbers of the search space are configuration information of RRC signaling of the base station. Specifically, a quantity of PDCCH occasions is determined in the foregoing manner, HARQ feedback information of Si (it is assumed that there are a maximum of Si pieces of DCI, Si of PDCCH occasions may be same or different, for example, Si of the PDCCH occasion of in first three symbols in one slot is greater than 1, Si of the PDCCH occasion in remaining symbols in one slot is equal to 1) PDSCHs is fed back in an $i^{th}$ PDCCH occasion. Feedback information of the Si PDSCHs may be orchestrated in the foregoing possible manners. If Si pieces of DCI are not monitored, the corresponding location is filled with a NACK. Optionally, when cross-slot scheduling is considered, a quantity S pieces of DCI in one PDCCH occasion may be a quantity of values of K0 in the table. For example, the values of K0 in rows in which the scheduling type is the type A in the Table 1 may be {0, 1}, a quantity S pieces of DCI in one PDCCH occasion is 2.

In any embodiment of the present invention, optionally, when the quantity of PDCCHs and/or the quantity of PDSCHs are/is determined, slot format information may be further considered. For example, when configuration of a time unit such as a slot or a symbol is uplink transmission, a PDCCH and/or a PDSCH corresponding to the time unit are/is not counted in the quantity of PDCCHs and/or the quantity of PDSCHs.

In another possible implementation of the present invention, the HARQ codebook is determined based on the PDCCH monitor occasion. For a process and a manner, refer to the foregoing description. Details are not described herein again.

The following describes another embodiment of the present invention, in this embodiment, for same or similar steps, functions, and term explanations similar to the foregoing embodiments, refer to the foregoing embodiments. The communication method includes that, for slot transmission (in other words, transmission on a PDSCH whose scheduling type is the type A), a semi-static codebook manner may be used. Feedback information of a semi-static codebook may be referred to as a codebook 1. Specifically, the semi-static codebook may be determined based on the quantity of PDSCHs, or may be determined by further combining a quantity of PDCCHs, in other words, is determined by min {a quantity of PDCCHs, a quantity of PDSCHs}.

Optionally, for non-slot transmission (in other words, transmission on a PDSCH whose scheduling type is the type B), a dynamic codebook manner may be used. Feedback information of a dynamic codebook may be referred to as a codebook 2.

The following specifically describes a determining manner of the dynamic HARQ codebook.

In this embodiment of the present invention, the dynamic HARQ codebook may be determined based on a quantity of actually scheduled PDSCHs. For example, HARQ feedback information may be determined based on a total downlink assignment index (T-DAI) and a counter downlink assignment index (C-DAI). Further, the base station may send DCI to the terminal, and the DCI includes first information and/or second information.

For example, T-DAI may be a total quantity of {carrier, PDCCH monitor occasion} pairs scheduled by the PDCCH or a total quantity of PDSCHs until a current time unit or PDCCH monitor occasion. C-DAI may be an accumulative quantity of {carrier, PDCCH monitor occasion} pairs scheduled by the PDCCH or an accumulative quantity of PDSCHs until the current time unit or PDCCH monitor occasion.

Figure 6:
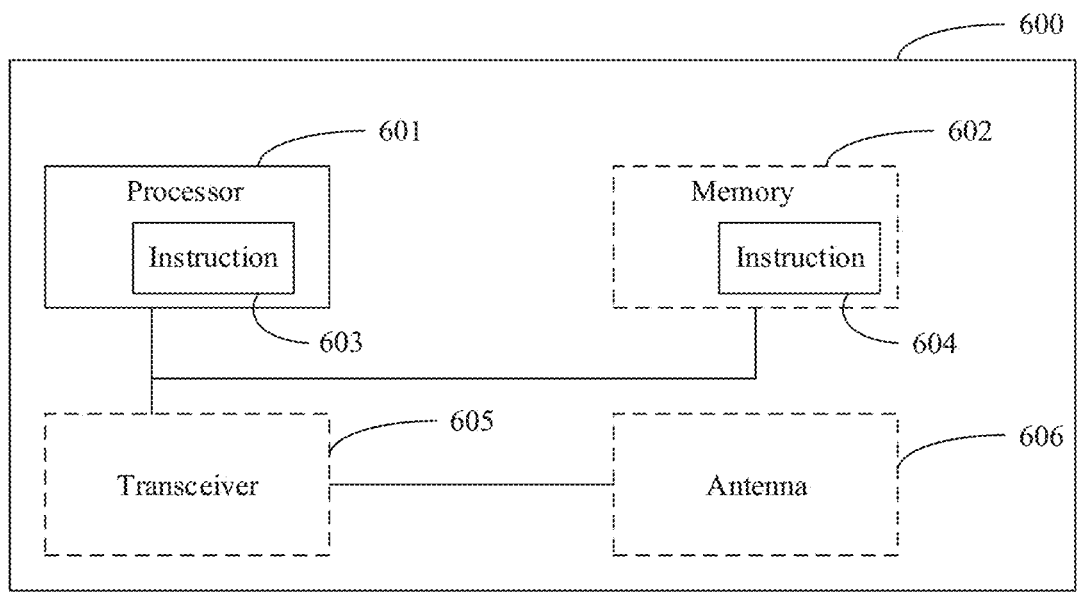
FIG. 6 is a schematic structural diagram of an apparatus according to an embodiment of this application.

As shown in FIG. 6, it is assumed that the base station configures five carriers, each carrier may be understood as a frequency domain resource. It is assumed that a HARQ time window includes four time units, the carriers are corresponding to a first time unit to a fourth time unit in the time window. Specifically, a grid having "D (m, n)" represents a time unit in which downlink data is transmitted through a PDSCH. The PDSCH or the time unit is scheduled by using DCI D (m, n). m represents a value of Total-DAI in DCI used to schedule the time unit or the PDSCH, and n is a value of Counter-DAI in the DCI used to schedule the time unit or the PDSCH. It is assumed that a PDSCH or downlink data scheduled by using DCI D (1, 1), D (3, 2), D (4, 4), D (6, 6) is correctly received on a receive end, and a PDSCH or downlink data scheduled by using DCI D (3, 3) is incorrectly received on the receive end. Therefore, the receive device does not monitor DCI D (6, 5). Because in a first time unit, data is scheduled on only a carrier 1, so that T-DAI=1, and C-DAI=1. In a second time unit, data is transmitted on each of a carrier 0 and a carrier 3, and data transmission in the first time unit is considered, so that T-DAI=3, C-DAI=2 on the carrier 0, and C-DAI=3 on the carrier 2. T-DAI and C-DAI in a third time unit and a fourth time unit can be obtained sequentially.

It is assumed that one PDSCH includes only one TB, a HARQ codebook of one bit needs to be fed back for one TB of one PDSCH, it is determined that a final HARQ codebook is 6 bits based on that T-DAI finally monitored in a time window is 6. For example, if 1 represents an ACK and 0 represents a NACK, the HARQ codebook is 110101. Because the receive end does not monitor DCI D (6, 5), the receive end may map feedback information of a PDSCH scheduled by using monitored DCI to a location corresponding to the C-DAI, and remaining locations in which no information is filled may be filled with NACKs (in other words, a location corresponding to C-DAI=5).

Downlink data missing may be monitored in the foregoing manner, to avoid a problem that the base station and the terminal have different understandings on the HARQ codebook.

For example, a quantity of PDSCHs or TBs corresponding to the PDCCH may be counted in a sequence first by frequency domain and then by time domain. For example, T-DAI and C-DAI are counted in a sequence first by frequency domain and then by time domain. Specifically, D (1, 1) is corresponding to the first bit of the HARQ codebook, D (3, 2) is corresponding to the second bit of the HARQ codebook, and so on.

TABLE 6

| Carrier number | First time unit | Second time unit | Third time unit | Fourth time unit |
| --- | --- | --- | --- | --- |
| CC0 |  | D (3, 2) correct |  |  |
| CC1 | D (1,1) correct |  | D (4, 4) correct | D (6, 5) missing |
| CC2 |  | D (3, 3) incorrect |  | D (6, 6) correct |
| CC3 |  |  |  |  |
| CC4 |  |  |  |  |

In this embodiment, for slot transmission (in other words, a PDSCH mapping type A), a codebook 1 is determined in a semi-static codebook manner. Specifically, the codebook 1 may be determined based on any one of the foregoing embodiment.

For non-slot transmission (in other words, a PDSCH mapping type B), a codebook 2 is determined in a dynamic codebook manner.

For example, the HARQ codebook fed back by the terminal to the base station may include a codebook 1 and/or a codebook 2. Specifically, if only the type A exists in a time domain resource table configured by using RRC signaling, only the codebook 1 needs to be fed back. If the type A and the type B both exist in a time domain resource table configured by using RRC signaling, and a PDSCH whose scheduling type is the type B is not scheduled, only the codebook 1 needs to be fed back. If only the type B exists in the time domain resource allocation table configured by using RRC signaling, only the codebook 2 needs to be fed back. If the type A and the type B both exist in the time domain resource allocation table configured by using RRC signaling, and a PDSCH whose scheduling type is the type B is scheduled, the codebook 1 and the codebook 2 both are fed back.

For example, when a codebook type configured by using RRC signaling is a semi-static codebook, the semi-static codebook (It should be noted that, only the type A is considered to determine a PDSCH occasion) is determined based on any foregoing embodiment. In other words, the semi-static codebook usually includes only HARQ codebook of the PDSCH whose scheduling type is the type A, or when the codebook type configured by using RRC signaling is the semi-static codebook, there is no configuration for the type B for all BWPs corresponding to all cells in a PUCCH cell group. If the type B exists in a time domain resource table for at least one BWP of at least one cell, optionally, the codebook fed back by the terminal may further include or may not include the codebook 2. Specifically, the codebook 2 is a dynamic codebook. Optionally, DCI used to schedule the foregoing BWP may include a DAI field. Optionally, the semi-static codebook may not include a HARQ codebook of a PDSCH in the foregoing BWP or cell.

In this embodiment of the present invention, it is mainly considered that because the PDSCH whose scheduling type is the type B is used, a quantity of possible PDSCH occasions may be large. If a semi-static codebook manner is used, feedback overheads are excessively large. Therefore, only the dynamic codebook is limited to be used for the type B, so that feedback overheads are reduced.

The following describes another embodiment of the present invention, in this embodiment, for same or similar steps, functions, and term explanations similar to the foregoing embodiment, refer to the foregoing embodiments. As shown in FIG. 5, the communication method includes the following steps:

501. Determine a quantity of PDSCHs based on a value set of K1 and a time domain resource allocation table.

502. Determine a HARQ codebook based on the quantity of PDSCHs and a quantity of processes.

For example, the foregoing determining steps may be performed by a terminal, a chip, or a communications device.

In this embodiment of the present invention, the terminal determines the HARQ codebook by using a smaller value between the quantity of PDSCHs and the quantity of processes.

Specifically, the terminal determines, based on the value set of K1 and the time domain resource allocation table, that a possible quantity of PDSCH occasions in a cell c is Nc. For a specific process, refer to the foregoing embodiments.

The terminal determines, based on RRC configuration signaling, that a quantity of processes of the cell c is Pc (for example, a value may be 2, 4, 6, 8, 10, 12, or 16).

If $Nc \leq Pc$ (or more generally may be written as $Nc \leq a*Pc+b$, and a and b may be predefined by using a protocol or may be configured by using signaling), a size of a semi-static codebook of the cell c is determined based on Nc. For a specific determining process of the HARQ feedback information, refer to the foregoing embodiments.

If $Nc \geq Pc$ (or more generally may be written as $Nc \geq a*Pc+b$, and a and b may be predefined by using a protocol and may be configured by using signaling), a size of a semi-static codebook of the cell c is determined based on Pc.

If $Nc \leq Pc$, for a generation process of the codebook, refer to the embodiment in the HARQ codebook is determined based on the PDSCH.

If $Nc \geq Pc$, a possible codebook orchestration manner is as follows. If DCI used to schedule a PDSCH is monitored in a possible PDSCH occasion determined in the foregoing embodiment and a process number of the monitored DCI is i ($0 \leq i < Pc$), X bits of HARQ feedback information of the PDSCH is placed at an $i^{th}$ location. If DCI whose process number is i is not monitored, the $i^{th}$ location is filled with a NACK of X bits by default.

If a plurality of PDSCHs scheduled by using the DCI whose process number is i are monitored, HARQ feedback information of the PDSCH scheduled by using the earliest or latest DCI that is monitored by the terminal and whose process number is i is at an $i^{th}$ location of the HARQ codebook. Alternatively, if a plurality of PDSCHs scheduled by using the DCI whose process is i are monitored, feedback information of the HARQ codebook of the PDSCH scheduled by using earliest or latest DCI that is monitored by the terminal and whose process number is i is at an $i^{th}$ location of the HARQ codebook.

For example, when a codebook type configured by using RRC signaling is a semi-static codebook, if the type B exists in a time domain resource allocation table of at least one BWP of at least one cell in a cell group, the HARQ codebook for the cell and/or the BWP is determined based on a quantity of configured processes, and a codebook for remaining cells is determined based on the PDSCH occasion. Alternatively, codebooks of all cells in the cell group are determined based on a quantity of configured processes.

In the foregoing embodiments, a plurality of BWPs are configured for one cell, each BWP has a plurality of values of K1 and a plurality of PDSCH occasions exist in one slot. Therefore, finally, a quantity of PDSCH occasions used to feed back a HARQ-ACK through one PUCCH may be greater than a quantity Pc of processes configured by using RRC signaling. In this case, obviously, an actual quantity of scheduled PDSCHs does not exceed Pc (because each PDSCH can correspond to only one process number, for a same process number, because whether data corresponding to the process number is initial transmission data or retransmission data is not known, each PDSCH usually may not carry other data before a HARQ-ACK feedback is received). Therefore, feedback overheads in this solution may be reduced.

Similarly, in another embodiment of the present invention, a HARQ codebook may be also determined based on a PDCCH occasion and a quantity of processes. A specific implementation is similar to that of determining the HARQ codebook based on the PDSCH occasion and the quantity of processes provided that the PDCCH occasion is replaced with a PDSCH occasion.

In the case in which the HARQ codebook is determined based on the quantity of processes and the quantity of PDSCHs or the quantity of PDCCHs, a possibility that a PDSCH is scheduled and a process status are comprehensively considered. This helps the terminal effectively generate the HARQ codebook, and ensures normal communication with the base station.

In another aspect, a scenario of a plurality of cells or BWPs is considered in the foregoing solution, thereby implementing flexible scheduling of an air interface.

For example, FIG. 6 is a schematic structural diagram of a communications apparatus 600. The communications apparatus 600 may be a device in the embodiments of this application, may specifically be a chip, a base station, a terminal, a communications device, or a network device.

The communications apparatus 600 includes one or more processors 601. The processor 601 may be a general-purpose processor, a special purpose processor, or the like, for example, may be a baseband processor, or a central processor. The baseband processor may be configured to process a communications protocol and communication data, and the central processor may be configured to control a communications apparatus (such as a base station, a terminal, or a chip), execute a software program, and process data of the software program.

In a possible design, the communications apparatus 600 may include one or more modules. The one or more modules may be implemented by one or more processors, or may be implemented by one or more processors and memories.

In a possible design, the communications apparatus 600 includes one or more processors 601. The one or more processors 601 may implement processing functions such as determining a quantity of PDSCHs, a quantity of PDCCHs, and/or a HARQ codebook. In another possible design, the processor 601 may further implement other functions in addition to the foregoing functions.

Optionally, in a design, the processor 601 may include an instruction 603 (sometimes also referred to as code or a program). The instruction may be run on the processor and the communications apparatus 600 is enabled to perform the method described in the foregoing embodiments. In still another possible design, the communications apparatus 600 may also include a circuit, and the circuit may implement the processing functions in the foregoing embodiments such as determining a quantity of PDSCHs, a quantity of PDCCHs, and/or a HARQ codebook.

Optionally, in a design, the communications apparatus 600 may include one or more memories 602. For example, the memory 602 may store an instruction 604. The instruction may be run on the processor, and the communications apparatus 600 is enabled to perform the method described in the foregoing method embodiments.

Optionally, the memory may further store data. Optionally, the processor may also store an instruction and/or data. The processor and the memory may be separately disposed, or may be integrated together.

Optionally, the communications apparatus 600 may further include a transceiver 605 and an antenna 606. The processor 601 may be referred to as a processing unit, and is configured to control a communications apparatus (a terminal or a base station). The transceiver 605 may be referred to as a transceiver unit, a transceiver, or a transceiver circuit, and is configured to implement a transceiver function of a communications apparatus by using the antenna 606.

Optionally, the communications apparatus 600 may further include a decoder configured to perform decoding or a modulator configured to perform modulation processing. Functions of these components may be implemented by using one or more processors 601.

Optionally, the communications apparatus 600 may further include an encoder configured to perform encoding, a decoder configured to perform decoding, and the like. Functions of these components may be implemented by using one or more processors 601.

The foregoing mainly describes the solutions provided in the embodiments of this application from the perspective of a method. It can be understood that, to implement the foregoing functions, the communications device or the network device includes a corresponding hardware structure and/or software module for performing each function. A person of ordinary skill in the art should easily be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed for the communications device and the network device according to the foregoing method examples. For example, function modules may be divided in correspondence to functions, or two or more functions may be integrated into one processing module. The integrated module may be implemented in a form of hardware, or may be implemented in a form of a software functional module. It should be noted that, in the embodiments of this application, module division is an example, and is merely logical function division. In an actual implementation, another division manner may be used.

Figure 7:
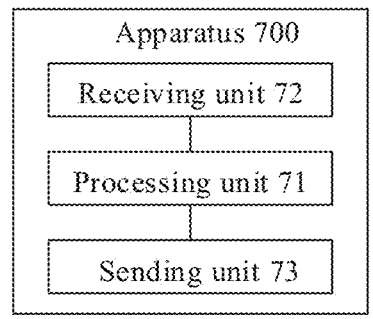
FIG. 7 is a schematic structural diagram of another apparatus according to an embodiment of this application.

In a case in which functional modules are divided based on corresponding functions, FIG. 7 is a schematic diagram of possible composition of an apparatus in the foregoing method embodiments of this application. The apparatus is the terminal, the communications device, or the chip in the foregoing embodiments. As shown in FIG. 7, an apparatus 700 may include a processing unit 71. Optionally, the apparatus 700 may further include a receiving unit 72 and/or a sending unit 73. In this embodiment, for same or similar steps, functions, and term explanations similar to the foregoing embodiments, refer to the foregoing embodiments.

In some embodiments, the processing unit 71 may be configured to determine a quantity of physical downlink shared channels PDSCHs based on a value set of K1 and a time domain resource allocation table; and determine a HARQ codebook based on the quantity of PDSCHs and a quantity of PDCCHs.

In some embodiments, the processing unit 71 determines the quantity of PDCCHs based on a value set of K1 a value of K0 in a time domain resource allocation table, a physical downlink control channel PDCCH period, a PDCCH monitor offset, and a PDCCH monitor pattern.

In some embodiments, the receiving unit 72 is configured to receive a value set of K1 a time domain resource allocation table, a physical downlink control channel PDCCH period, a PDCCH monitor offset, and a PDCCH monitor pattern.

In some embodiments, the processing unit 71 is configured to determine a quantity of PDSCHs (or referred to as a DL association set) based on a value set of K1 and a time domain resource allocation table; and determine a HARQ codebook based on the quantity of PDSCHs.

In some embodiments, the receiving unit 72 is configured to receive a value set of K1 and a time domain resource allocation table.

In some embodiments, the processing unit 71 is configured to determine a quantity of PDSCHs (or referred to as a DL association set) based on a value set of K1 and a time domain resource allocation table; and determine a HARQ codebook based on the quantity of PDSCHs and a quantity of processes.

In some embodiments, the sending unit 73 is configured to send a dynamic codebook of a HARQ codebook when a PDSCH is corresponding to a first type, or send a semi-static codebook of a HARQ codebook when a PDSCH is corresponding to a second type.

In some embodiments, the apparatus 700 may further include an accumulation unit, configured to: when there are a plurality of first types, determine through accumulation that a quantity of PDSCHs corresponding to the plurality of the first types is 1; and when there are a plurality of second types, accumulate a quantity of PDSCHs whose scheduling type is the second type and whose time units do not overlap.

Further, the processing unit 1 may be configured to support the apparatus 700 in performing the determining steps, for example, determining a HARQ codebook, a quantity of PDCCHs, and/or a quantity of PDSCHs in FIG. 1, FIG. 3, or FIG. 5 in the method embodiments. In addition, various units in FIG. 7 may also be used in another process of the technology described in the specification.

It should be noted that for all the related content of various steps according to the foregoing method embodiments, refer to the function descriptions of corresponding function modules. Details are not described herein again.

The apparatus provided in the embodiments of this application is configured to perform the foregoing communication method. Therefore, effects the same as that of the foregoing communication method can be achieved.

In another embodiment, a person skilled in the art may come up with an idea that a module in the apparatus 700 is corresponding to a component in FIG. 6. The apparatus 700 may be implemented by using a structure shown in FIG. 6.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   determining, by a communications device, a physical downlink shared channel (PDSCH) occasion based on a value set of K1 and time domain resource allocation information for downlink data; and
   determining, by the communications device, first hybrid automatic repeat request (HARQ) feedback information based on the PDSCH occasion, wherein
   the value set of K1 comprises a set of values, each of which corresponds to a timing relationship between transmission of downlink data and transmission of HARQ feedback information, and the value set of K1 is related to a downlink control information (DCI) format.

2. The method according to claim 1, wherein, when fallback DCI is configured to be monitored and non-fallback DCI is not configured to be monitored, the value set of K1 is a second set.

3. The method according to claim 2, further comprising:
   monitoring, by the communications device, the fallback DCI in a search space without monitoring the non-fallback DCI; and
   determining, by the communications device, that the value set of K1 is the second set based on the fallback DCI, wherein the search space is a common search space or a specific search space.

4. The method according to claim 3, wherein
   the second set is predefined.

5. The method according to claim 2, wherein when the non-fallback DCI is configured to be monitored, the value set of K1 is a first set.

6. The method according to claim 5, further comprising:
   monitoring, by the communications device, the non-fallback DCI in a specific search space; and
   determining, by the communications device based on the non-fallback DCI, that the value set of K1 is the first set.

7. The method according to claim 6, further comprising:
   receiving, by the communications device, radio resource control (RRC) signaling, wherein the RRC signaling comprises the first set.

8. The method according to claim 5, wherein
   the non-fallback DCI has a DCI format 1_1, and the fallback DCI has a DCI format 1_0.

9. An apparatus, comprising a processor and a memory, wherein
   the processor is configured to:
   determine a physical downlink shared channel (PDSCH) occasion based on a value set of K1 and time domain resource allocation information for downlink data, wherein determine first hybrid automatic repeat request (HARQ) feedback information based on the PDSCH occasion; and the value set of K1 comprises a set of values, each of which corresponds to a timing relationship between transmission of downlink data and transmission of HARQ feedback information, and the value set of K1 is related to a downlink control information (DCI) format.

10. The apparatus according to claim 9, wherein the apparatus further comprises a receiver; and when the receiver is configured to monitor fallback DCI, and is not configured to monitor non-fallback DCI, the value set of K1 is a second set.

11. The apparatus according to claim 10, wherein the receiver is further configured to monitor the fallback DCI in a search space without monitoring the non-fallback DCI; and the processor is further configured to determine, based on the fallback DCI, that the value set of K1 is the second set, wherein the search space is a common search space or a specific search space.

12. The apparatus according to claim 11, wherein the second set is predefined.

13. The apparatus according to claim 10, wherein when the receiver is configured to monitor the non-fallback DCI, the value set of K1 is a first set.

14. The apparatus according to claim 13, wherein the receiver is further configured to monitor the non-fallback DCI in a specific search space; and the processor is further configured to determine, based on the non-fallback DCI, that the value set of K1 is the first set.

15. The apparatus according to claim 14, wherein the receiver is further configured to:

receive radio resource control (RRC) signaling, wherein the RRC signaling comprises the first set.

16. The apparatus according to claim 13, wherein the non-fallback DCI has a DCI format 1_1, and the fallback DCI has a DCI format 1_0.

* * * * *